Richard Franklin Stringer
Kenneth Earl Draeger
Maurice A. Bergougnou
Inventors

By *Byron O. Dimmick*  Patent Attorney

Richard Franklin Stringer
Kenneth Earl Draeger    Inventors
Maurice A. Bergougnou By *Byron O. Dimmick*    Patent Attorney

United States Patent Office 3,164,642
Patented Jan. 5, 1965

3,164,642
PARAFFIN HYDROCARBON ISOMERIZATION
USING SWING REACTOR SYSTEM
Richard Franklin Stringer and Kenneth Earl Draeger, Baton Rouge, La., and Maurice A. Bergougnou, Metuchen, N.J., assignors to Esso Research and Engineering Company, a corporation of Delaware
Filed Sept. 14, 1960, Ser. No. 55,980
4 Claims. (Cl. 260—683.7)

This invention concerns improvements in the catalytic isomerization of paraffin hydrocarbons, particularly those having from 4 to 7 carbon atoms. More especially, the invention relates to the preparation of highly branched paraffin hydrocarbons by contacting the corresponding less branched isomers with aluminum halides and particularly with aluminum bromide. The process of the invention is a continuous liquid phase process that provides more consistent product quality with less degradation of catalyst than has been heretofore possible.

The isomerization of straight chain or normal paraffin hydrocarbons into the corresponding branched chain isomers is well known. The process as applied particularly to hydrocarbons of up to 7 carbon atoms is a valuable one for the petroleum refiner because it provides a useful source of high octane rating components for use in automotive and aviation fuels. Friedel-Crafts catalysts and particularly the metal halides are especially adaptable to this process. The aluminum halides such as aluminum chloride and aluminum bromide are most frequently employed usually in conjunction with such promoters as hydrogen chloride, hydrogen bromide, hydrogen fluoride, and boron fluoride.

When light naphthas are isomerized, it is desirable to conduct the reaction at relatively low temperatures in order to direct the reaction equilibrium toward the formation of those branched chain isomers that have the highest antiknock ratings. In general, temperatures of from about 40° to about 150° F. are most desirable for this reason. Aluminum bromide has been found to be more active than the chloride in this range of temperatures. The activity of the aluminum bromide is greatly enhanced if it is associated with a suitable support, such as alumina, silica gel, calcined bauxite, ferric oxide, activated carbon, and the like.

While supported aluminum bromide is highly active as a paraffin hydrocarbon isomerization catalyst, there are certain disadvantages associated with its use. One of these is that aluminum bromide must be present both on the support and in solution in the reacting hydrocarbons. Thus, aluminum bromide will be present in solution in the effluent from the reactor. As a result, aluminum bromide leaves the system both in the effluent stream and in the spent support that is periodically discharged and replaced.

Another disadvantage associated with aluminum bromide and other highly active isomerization catalysts is that they promote side reactions, such as cracking and disproportionation, which in turn lead to severe catalyst deactivation and sludging.

It has in the past been proposed to minimize cracking and catalyst deactivation by adding naphthenic hydrocarbons, such as cyclohexane, methylcyclopentane, etc., to the hydrocarbon feed to an isomerization reaction, and in the case of the higher paraffins, such as hexane and heptane, to employ isobutane in conjunction with the naphthenic hydrocarbons as a cracking stabilizer. While these expedients have accomplished the desired purpose to a considerable extent, there still has been the necessity of gradually increasing reaction severity as the catalyst in the reaction zone increases in age, i.e., in time of use, in order to maintain catalyst activity. The reaction severity can be increased by raising the temperature, increasing the amount of hydrogen halide promoter used, or lowering the feed rate. Such shifts in reaction severity have the disadvantage of varying product quality.

It is one object of the present invention to provide a reactor system and isomerization process which will make possible the recovery of the dissolved aluminum bromide from the reactor system in the form of fresh catalyst. This in turn will reduce the overall consumption of aluminum bromide.

It is another object of the invention to furnish a reactor system that will provide for the maintenance of a consistent level of catalyst activity and at the same time a consistent level of isomerization product quality.

In accordance with this invention, the above objects are met by providing a reactor train comprising a plurality of reaction zones (at least three) through which the stream of hydrocarbon to be isomerized is passed in series. All of the reaction zones except the final one in the chain initially contain an aluminum halide catalyst, preferably $AlBr_3$ on a support such as silica or alumina, while the last reaction zone of the series initially contains the support substantially devoid of aluminum halide. Suitable conditions for the isomerization of paraffin hydrocarbons are maintained in at least all of the reaction zones except the final zone. Isomerization then takes place in the zones containing aluminum bromide, and as the hydrocarbon passes through those zones it will carry with it a small amount of dissolved aluminum bromide. This aluminum bromide will be adsorbed from the stream by the catalyst support in the final zone of the series. As the process proceeds, the final zone will undergo a gradual build-up in aluminum bromide until a point is reached where it will no longer adsorb additional aluminum bromide. At this point, an additional reaction zone containing catalyst support which is substantially devoid of aluminum halide will be added to the last position of the chain and one of the reaction zones in the front part of the chain will be removed. This will ordinarily be the zone containing the catalyst that is most spent, i.e., that has become least reactive. As will be pointed out hereinafter there is a distinct advantage for selecting the first zone in the chain for discard each time a new swing zone is introduced. The zone removed from the chain can be renewed by removing the spent catalyst and support and by charging it with a fresh supply of catalyst support. Preferably swing cycles of from about 7 to 20 days are used.

Reaction conditions in conducting the process of this invention include temperatures in the range of from about 40° to about 150° F. both in the isomerization zones and in the adsorption zone, and pressures sufficiently high to maintain the reacting hydrocarbons in the liquid phase. Preferred temperatures when using AlBr$_3$ are those in the range of about 100 to 125° F. Feed rates may vary from about 0.1 to about 1 v./v./hr. The concentration of AlBr$_3$ on total feed to the reactors is preferably in the range of from about 0.05 to about 0.5 weight percent.

While the reaction system of the present invention does minimize catalyst degradation and sludging, a small loss in catalyst activity will still be experienced, which will be offset, however, by formation of fresh catalyst in the system, and by periodic discard of partially deactivated catalyst from the system. Any small variations in catalyst activity that occur in the intervals between the periodic discharge of catalyst can be compensated for by such means as slight variations in temperature, in rate of AlBr$_3$ addition, feed rate, etc.

The nature of the invention and the manner in which it can be practiced will be more easily understood when reference is made to the accompanying drawing in which FIG. 1 is a schematic flow plan of one embodiment of the process;

Figure 1:
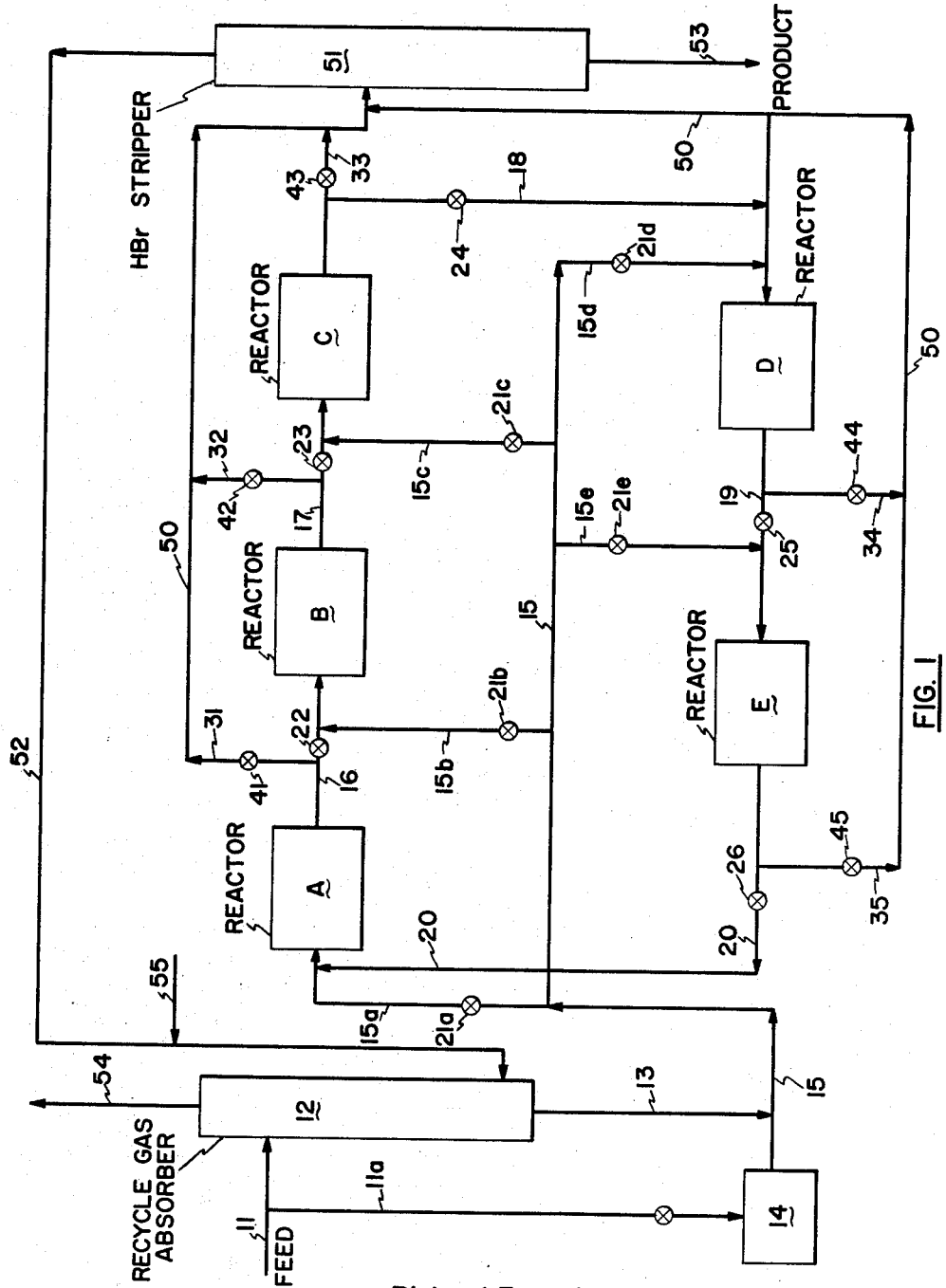

The process will be particularly described in connection with the use of aluminum bromide as the isomerization catalyst. Referring now to FIG. 1, the feed stream for the process is obtained from a suitable source by means of line 11. This feed stream may, for example, comprise a refinery hexane cut or a light naphtha feed which initially contains materials that might poison the catalyst. Among such materials are olefins, sulfur compounds, and aromatic hydrocarbons, such as benzene. It is desirable that such materials first be removed from the feed stock. This may be done by means not shown in the figure and may involve such steps as solvent extraction, extractive distillation, hydrogenation, or treatment with selective adsorbents, such as molecular sieve zeolites.

The treated naphtha feed entering through line 11 is first conducted to a recycle gas absorber and vent gas scrubber 12 where it is saturated with hydrogen halide which in this instance will comprise hydrogen bromide entering through recycle line 52. Small quantities of unwanted gases such as methane and ethane produced in the process can be vented via line 54. Make-up HBr and/or HBr needed for start-up can be supplied via line 55. To supply the small amount of make-up aluminum bromide that may be required in the process, a small portion of the feed stream is diverted by means of line 11a through an aluminum bromide pick-up zone 14 containing aluminum bromide in a suitable state for solution in the diverted stream. The effluent from absorber 12 is conducted by means of line 13 to feed distribution line 15 which also receives the effluent from pick-up zone 14.

As illustrated in the drawings, the reaction system may include five zones labeled A, B, C, D, and E. At least three zones will be in use at any one time. Preferably, at least three of the zones will be used for the isomerization reaction and a fourth zone for adsorption of aluminum bromide, while the fifth zone is being made ready for use in the reaction train. Initially, at the start of the process, zones A, B, and C may be charged with a suitable suport, such as calcined bauxite saturated with aluminum bromide, while zone D will contain a support with no aluminum bromide. Alternatively, instead of charging zones A, B, and C with previously saturated support, the support devoid of AlBr$_3$ may be placed in the zones and then saturated in situ by running in feed initially containing a relatively high concentration of aluminum bromide. The valves in the various lines may then be set so that feed will flow from distribution line 15 through line 15a into zone A, from there through line 16 to zone B, thence through line 17 to zone C, and finally through line 18 to zone D. Valve 25 in line 19 will be closed and valve 44 in line 34 will be opened so that the effluent from zone D can pass directly into effluent collection line 50 and then be conducted into hydrogen bromide separator 51 to enable recovery and recycle of hydrogen bromide through line 52, while the isomerized naphtha, free of halides, leaves via line 53 and can be sent to a gasoline blending step, preceded if necessary by caustic and water washing steps. If isobutane has been added to modify the reaction, it will also be recycled via line 52.

As stated previously, zones A, B, and C will be maintained under proper conditions to bring about the desired isomerization. Since the reaction is exothermic, it may be desirable to employ cooling between the zones in order to maintain the same temperature in each zone. The necessary heat exchangers are omitted from the drawing so that the latter will not be unduly complex. There is some advantage to be gained in employing a temperature gradient in the system as shown in one of the examples presented later in the specification.

The effluent from zone C will carry with it a certain amount of dissolved aluminum bromide. This aluminum bromide is removed from the hydrocarbon stream by the bauxite in zone D. When the support in zone D becomes saturated with aluminum bromide, valve 44 is closed and valve 25 is opened so that the effluent from zone D can be conducted by means of line 19 into zone E, which has now been prepared for use by charging it with the bauxite support substantially devoid of aluminum bromide. One of the reaction zones A, B, or C is then cut out of the train. Normally the zone thus removed would be zone A, although zone B or C could be removed if desired. In the latter event, suitable bypass lines, which are not shown in the figure, would be provided for this purpose. Assuming that zone A is cut out of the system, valve 21a would be closed and valve 21b would be opened, thus sending the feed initially through line 15b into zone B and then through zones C, D, and E. Zone A is then replenished with fresh catalyst support to become the last reaction zone in the train when zone E has become saturated with aluminum bromide and has been "swung" into the reaction train.

In the process description just presented it is seen that zones D and E serve as the first and second swing reactors, respectively. While each in its turn serves to replace a reaction zone that is cut out of the train, it does not take the place of the removed reactor insofar as reaction zone sequence in the train is concerned. It will generally be found preferable to operate in this manner, i.e., with movement of catalyst countercurrent to the flow of hydrocarbon being isomerized. However, the invention is not limited to this particular sequence.

The use of a proper sequence for the swing reactors will have distinct advantage over any other method of changing reactor locations. This proper sequence for a three reactor plus swing reactor system is: Swing reactor to #3 or tail reactor position to #2 or mid reactor position to #1 or lead reactor position. One advantage of this sequence is that premature switching of the reaction zone being saturated will cause the minimum upset to the reaction system if it is placed in the tail position. The swing reactor, after apparent saturation, will probably continue to adsorb some additional AlBr$_3$. If this reactor is placed in any other position than #3, it will remove relatively large amounts of AlBr$_3$ from solution and hence reduce the reaction rate in any reactors down stream from it. The lead reactor will act as a guard chamber (in addition to a reactor) to remove any trace impurities such as water or sulfur which come through the feed pretreat system. Removal of these feed impurities will deactivate the inlet portion of the catalyst. If this first reactor is to be discarded shortly, minor upsets in feed pretreating will not be serious; however, if this lead reactor is to be subsequently used in #2 locations, these upsets will be serious. On the other hand if the lead reactor has become deactivated due to an upset in the feed pretreatment, removing this reactor during the next shift of reactors will diminish the effect of the upset most rapidly. Another point to be considered for choosing the #1 reactor for discard is that this reactor will have the greatest temperature rise and hence will probably have the greatest deactivation rate.

Figure 2:
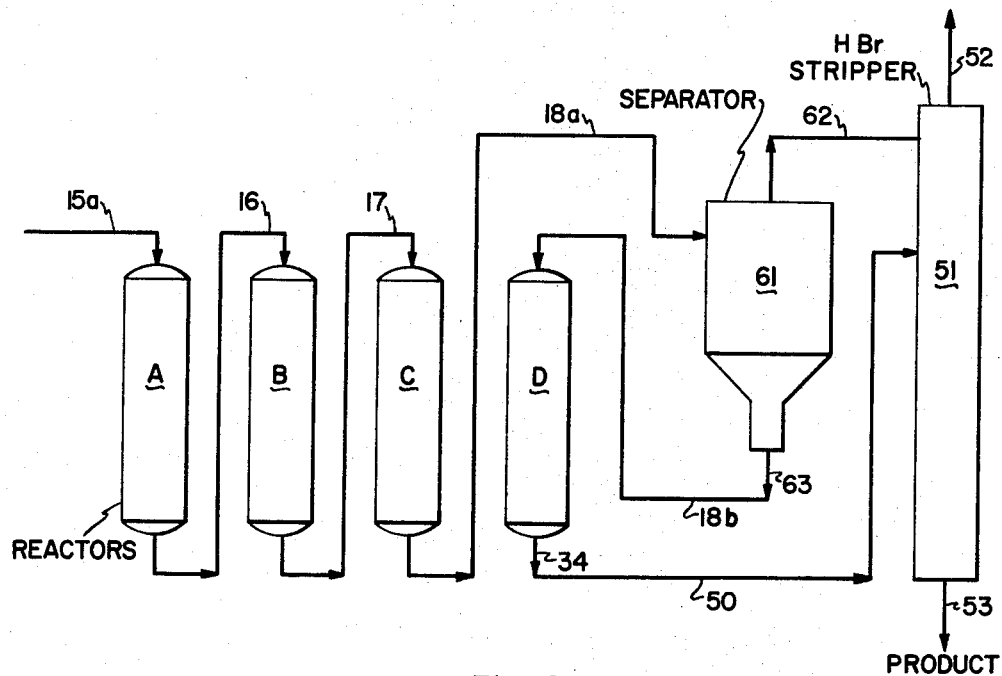
FIG. 2 is a schematic sketch of a modification of the process.

In the above description the hydrogen halide promoter is removed from the effluent leaving the reaction zone that is being saturated with catalyst. In some cases it may be advantageous to remove the hydrogen halide before the aluminum halide and product pass into the swing reactor, i.e., the zone on adsorption. This is illustrated schematically in FIG. 2. The zones are identified as in FIG. 1, but the valves and by-pass lines have been omitted, for simplicity. In this instance zone D is on adsorption and zone A is the lead reactor. The effluent from zone C, instead of going to zone D directly, is conducted into separator 61 by means of line 18a. Here hydrogen halide is separated from the liquid stream and is conducted into stripping zone 51 by means of line 62. The effluent, now free of hydrogen halide, leaves the separator through line 63 and is then sent through swing reactor D and thereafter handled in the same manner as described in conjunction with FIG. 1. It is to be understood, of course, that suitable valves and by-pass lines are provided so that each of the other zones can be used in the same manner as just described. By separating the HBr from the product stream before the catalyst adsorption step, higher catalyst activity may result through the elimination of any reaction in the zone that is "on adsorption" while the catalyst is being deposited on the support.

The following examples illustrate the operation of the process of this invention. In these examples, the feed consisted of a benzene-free $C_5/C_6$ refinery naphtha that had been given a hydrogenation treatment to remove olefins.

EXAMPLE 1

Three reaction zones were charged with calcined bauxite (Porocel), and then the support in the reaction zones was saturated with aluminum bromide by running through them a stream of the feed hydrocarbons containing 1 wt. percent of dissolved aluminum bromide. After the support had become thus saturated, the aluminum bromide level in the feed was reduced to 0.3 wt. percent, and hydrogen bromide was also added to the feed and the isomerization reaction was begun. Reaction conditions included inlet temperatures of from 100 to 115° F., 100 p.s.i.g. pressure, 9 wt. percent hydrogen bromide, and a feed rate of 0.4 v./v./hr. Under these conditions a conversion level of 90 percent isohexanes in total paraffinic hexanes was obtained. The feed contained 60 percent isohexanes based on total paraffinic hexanes. After seven days of operation, the fourth reaction zone was placed in series with the original three zones. The fourth reaction zone contained calcined bauxite but no aluminum bromide. After seven additional days of operation, the support in the fourth zone became saturated with aluminum bromide. Then, the additional reaction zone containing calcined bauxite was added at the end of the train, and one of the original three reaction zones was cut out of the system. After additional intervals of seven days each, additional reaction zones containing calcined bauxite were placed at the end of the train, and each of the remaining original zones was cut out of the system. Thus, a seven day swing system was set up. After the fourth swing had been completed, the reactor train contained only catalyst that had been formed on stream by adsorption from the preceding reaction zones. Swing reactor activity was found to be equivalent to that of the lead reactors or of conventional reactors at equivalent catalyst age, and good product selectivity was obtained with very little cracking or formation of high boiling products.

It was determined that each of the first five swing reaction zones adsorbed on the average of about 20 wt. percent of aluminum bromide while in the adsorption position. This quantity was measured by the actual adsorption of aluminum bromide across the reactors while in the adsorption position. It was also determined, by measurement of total weight gain, that the reactors adsorbed additional $AlBr_3$ when in other positions in the train, since the total $AlBr_3$ on the support when reaction zones were removed from reactor train averaged about 30 weight percent. Related studies have established that Porocel will rapidly adsorb 20 to 25 weight percent $AlBr_3$ and then gradually adsorb additional $Br_3$ up to a total amount of about 30 to 35 weight percent.

EXAMPLE 2

Using the same reactor system as in Example 1, a temperature gradient was employed in which the fourth, or swing, reactor was maintained at 100° F., the third reactor was maintained at 105° F., the second at 115° F., and the lead reactor at 125° F. A feed rate of 0.4 v./v./hr. was used, and 0.3 weight percent of aluminum bromide was present in solution in the feed, and 9 weight percent of hydrogen bromide was used as promoter. A swing cycle of seven days was used. The conversion, with equilibrium catalyst formed in the system, amounted to 91.6 percent isohexanes to total paraffinic hexanes, which represented a considerable gain in catalyst performance over the 90 percent conversion obtained when operating at 100–115° F. in Example 1.

EXAMPLE 3

In a manner similar to that in Example 2, comparisons were made between operating with a constant 100° F. temperature for all reactors, a constant 125° F. in all reactors, and a temperature gradient for all reactors. Feed rates were adjusted to give 90 percent conversion of hexanes. The conditions are set forth in Table I.

Table I

| Temp., ° F. | 100° F. in all Reactors | 125° F. in all Reactors | 100° F. Swing<br>105° F. #3 Reactor<br>115° F. #2 Reactor<br>125° F. Lead Reactor |
|---|---|---|---|
| i-$C_6$ Conversion, percent | 90 | 90 | 90 |
| V./V./Hr. | 0.296 | 0.32 | 0.38 |
| Days between swings | 8 | 7 | 6 |

As the data in Table I indicate, a higher catalyst activity results when using a temperature gradient of from 100° F. in the swing reactor to 125° F. in the lead reactor as compared with using either a constant 100° F. or a constant 125° F. in all reactors.

EXAMPLE 4

The effect of reactor temperature on catalyst life is demonstrated by the following test results. Four comparative runs were made in which the catalyst consisted of aluminum bromide on a Porocel support. The feed was a mixture of $C_5$-$C_6$ hydrocarbons, and the feed rate in each case was 0.039 v./v./hr., 100 volume percent isobutane being added with the feed to control cracking. Conditions were selected in each case to give a conversion of 90 percent isohexanes in total paraffinic hexanes. The operating schedule in each of the runs is set forth in Table II. The maximum number of days that the catalyst could be used effectively in each case is also set forth in the table.

Table II

| Case | 1 | 2 | 3 | 4 |
|---|---|---|---|---|
| V./V./Hr. on $C_5/C_6$ | 0.039 | 0.039 | 0.039 | 0.039. |
| Isobutane, percent on $C_5/C_6$. | 100 | 100 | 100 | 100. |
| Support | Porocel | Porocel | Porocel | Porocel. |
| Conversion, percent i-$C_6$ | 90 | 90 | 90 | 90. |
| Operating Schedule | 100° F. constant temperature. HBr and $AlBr_3$ increase to offset deactivation. 9% max. HBr, 0.2% max. $AlBr_3$. | 125° F. constant temperature. Otherwise same as Case 1. | Constant 100° F. temperature for first 136 days. HBr and $AlBr_3$ increased during first 138 days to offset deactivation. Temperature increased as needed thereafter to offset deactivation. 125° F. max. temp. | Same as Case 3 except temperature increased in 5 equal steps of 5° F. each. |
| Maximum Run Length, Days. | 138 | 138 | 365 | 320. |

As shown in Table II, optimum operation is obtained by running at constant temperature as long as possible and then increasing temperature only as needed to offset temperature. Increasing temperature prematurely decreases catalyst life. Using a slow continuous increase in temperature (Case 3) gives longer catalyst life than is obtained by increasing temperature in several relatively large steps.

Figure 3:
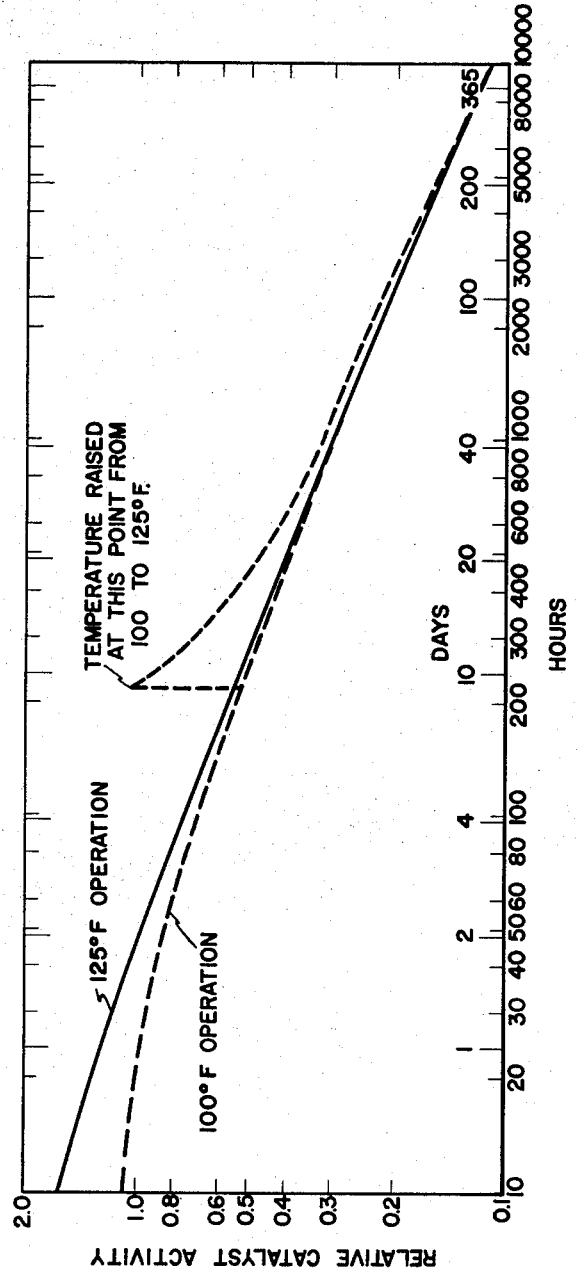
FIG. 3 is a graphic presentation, on logarithmic coordinates, of the effect of catalyst age on isomerization activity.

The swing reactor system of the present invention gives a higher resultant catalyst activity than is attained with a conventional fixed bed reactor system. This is because of the relatively low average age of catalyst employed when using the swing reactor system. As shown in FIG. 3, catalyst activity at a given reactor temperature decreases with catalyst age. Both age and activity are plotted on logarithmic scales in the figure. It will be noted that the rate of deactivation at 125° F. is much greater than at 100° F. As a result, continuous operations at 100° F. gives very nearly the same activity as continuous operations at 125° F. Increasing temperature with an aged catalyst gives an increase in activity, but the deactivation rate also increases so that the beneficial result of the increase in temperature is short-lived. Thus, in order to attain an improvement for increasing temperature in either the swing reactor system or the conventional reactor system, the reactor temperature must be continually increased as the catalyst ages. This is the basis for the improved operation obtained with the temperature gradient shown in Examples 2 and 3.

Figure 4:
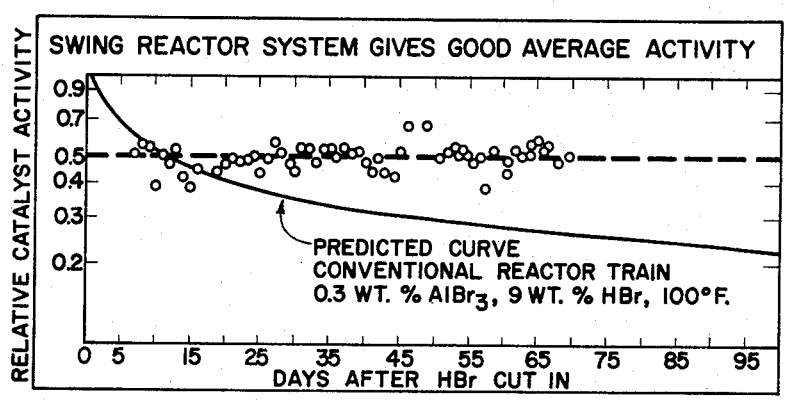
FIG. 4 is a graphic comparison of the catalyst activity obtainable with the present invention versus activity in a conventional system.

FIGURE 4, which contains a plot of catalyst activities obtained in the runs described in Example 1, and a plot of predicted activities for a conventional reactor train under the same reaction conditions, shows graphically the advantages of the swing reactor system. In the swing reactor system (3 reactors+swing reactor) employing a 7-day swing cycle, the activity of the catalyst is an integrated average activity between 0 and 28 days age. In a conventional reactor system, conditions during the run must be altered to offset catalyst deactivation. In commercial practice, a constant feed rate is employed and other conditions are varied to offset deactivation. Hence, the controlling catalyst activity is that at the end of the run. Thus, the catalyst age at discharge in the conventional reactor system must be less than 28 days to match the activity in this swing reactor system.

Aluminum bromide consumption in the swing reactor system is lower than that in the conventional reactor system. In the swing reactor system the only aluminum bromide added is that supplied with the feed. In the conventional reactor system, aluminum bromide is added to the system in two ways. First, the support must be saturated with aluminum bromide before it is active for isomerization. Then aluminum bromide must be added along with the feed to obtain an active system. The aluminum bromide consumption in the conventional reactor system will always be higher than that in the swing reactor system by that amount used to saturate the support in the conventional reactor system. In the swing reactor system, the aluminum bromide needed to saturate the support is recovered from the reactor effluent.

Thus, the swing reactor has definite advantages over the conventional reactor system. These include (1) essentially constant catalyst activity, (2) high catalyst activity, (3) lower aluminum halide consumption, and (4) long run lengths not limited by unit turnarounds to replace catalyst. The conventional reactor system can be operated at the high catalyst activity obtained in the swing reactor system by frequent changes of catalyst. Such an operation is not attractive, however, because of the high aluminum bromide consumption required in saturating the support. In order to minimize aluminum bromide consumption, long catalyst life is required in the conventional reactor system. This results in low catalyst activity and generally requires addition of inhibitors, such as isobutane. The isobutane inhibitor is not required in the swing reactor system.

An added advantage accruing from use of the swing reactor system of the present invention is that since there will be essentially no $AlBr_3$ dissolved in the product, it having been removed by the "swing" zone, corrosion problems in further handling of the product will be minimized, and caustic treating requirements of the product will be reduced.

While the invention has been particularly described with reference to the use of aluminum bromide as the catalyst, the invention is likewise applicable to aluminum chloride isomerization as well, where at higher reaction temperatures $AlCl_3$ solubility may be appreciable. The invention is particularly applicable to $AlBr_3$ catalyzed isomerization, however.

The scope of the invention is to be determined by the appended claims and is not to be limited to the examples.

What is claimed is:

1. In the isomerization of a light naphtha hydrocarbon stream in the presence of aluminum bromide on a support and in the presence of aluminum bromide dissolved in said hydrocarbons wherein the isomerization reaction is carried out in the liquid phase, the improvement which comprises continuously flowing said hydrocarbons in the same direction of flow through a train of at least three reaction zones in series, wherein the temperature of the isomerization reactions taking place in the reaction zones are of decreasing magnitude gradually from a temperature of about 125° F. to a temperature of about 105° F. in the successive isomerization reaction zones, all of said zones except the last one initially containing said aluminum bromide on said support, the last reaction zone of the series initially containing said support substantially devoid of aluminum bromide, maintaining hydrocarbon isomerization conditions in at least all of said reaction zones except said last zone, continuing hydrocarbon flow through said series of zones wherein the entire hydrocarbon effluent from the preceding zones are fed to the last zone in series until sufficient aluminum bromide has been absorbed from said hydrocarbon stream by the support in said last zone to catalyze isomerization in said last zone, thereafter discontinuing hydrocarbon flow through the first of said zones and removing said first zone from said train, and conducting hydrocarbon flow through the remaining zones and through an additional zone in series, said additional zone initially containing said support substantially devoid of aluminum bromide, replenishing a zone removed from said train with said support substantially devoid of aluminum bromide and then adding this zone as the last zone in the series and then conducting hydrocarbon flow of the entire hydrocarbon effluent from the preceding zones through said replenished last zone.

2. Process as defined by claim 1 wherein said aluminum halide comprises aluminum bromide and wherein the hydrocarbon stream entering the first reaction zone contains dissolved therein from about 0.05 to about 0.5 weight percent of aluminum bromide.

3. The process of claim 1 wherein the temperatures of the isomerization reactions taking place in the reaction zones are of decreasing magnitude wherein the isomerization reaction temperature in said first isomerization zone is about 125° F., and the reaction temperature in the second reaction zone is about 115° F., and the reaction temperature in the third reaction zone is about 105° F. and the temperature in said additional zone initially containing said support substantially devoid of aluminum bromide is about 100° F.

4. The process of claim 1 wherein the catalyst support is calcined bauxite and wherein the support absorbs 20–25 wt. percent of aluminum bromide while in the absorption zone and absorbs an additional 5–10 wt. percent aluminum bromide during the isomerization reaction.

References Cited in the file of this patent
UNITED STATES PATENTS

| | | |
|---|---|---|
| 2,323,830 | McMillan | July 6, 1943 |
| 2,324,746 | Weinrich et al. | July 20, 1943 |
| 2,349,516 | Pines et al. | May 23, 1944 |
| 2,403,181 | Jones | July 2, 1946 |
| 2,429,218 | Carney | Oct. 21, 1947 |
| 2,946,833 | Kimberlin et al. | July 23, 1960 |